June 19, 1923.　　　F. A. STEVENS　　　1,459,348

OPHTHALMIC MOUNTING

Filed Dec. 10, 1919

Inventor
Frederick A. Stevens
by David Rines
Attorney

Patented June 19, 1923.

1,459,348

UNITED STATES PATENT OFFICE.

FREDERICK A. STEVENS, OF PROVIDENCE, RHODE ISLAND, ASSIGNOR TO STEVENS AND COMPANY, INC., OF PROVIDENCE, RHODE ISLAND, A CORPORATION OF RHODE ISLAND.

OPHTHALMIC MOUNTING.

Application filed December 10, 1919. Serial No. 343,921.

*To all whom it may concern:*

Be it known that I, FREDERICK ARTHUR STEVENS, a citizen of the United States, and a resident of Providence, in the county of Providence and State of Rhode Island, have invented a new and useful Improvement in Ophthalmic Mountings, of which the following is a specification.

The present invention relates to ophthalmic mountings, and more particularly to mountings in which provision is made for adjusting the lens upon the lens strap, thereby preventing a relative movement of the lens and the strap.

It has hitherto been proposed to effect the above-named adjustment by means of an eccentric post, the eccentric portion of which, of comparatively large diameter, lies within the perforation in the lens, and the concentric or head portion of which is seated within a countersunk perforation in the ear. Upon rotation of the post, the eccentric portion engages the wall of the lens perforation, effecting the adjustment of the lens. These proposals have hitherto met with failure in practice. The proposed posts were of specially constructed design, involving difficulties of manufacture, the perforations in the strap ears, if not exactly positioned, defeated the very object of the adjustment or even caused breakage of the lens, and each mounting could be used with but one and the same type and thickness of lens, requiring different and new designs of mountings for other lenses and for lenses of varying thickness.

The object of the invention, accordingly, is to improve ophthalmic mountings of the above-designated character, rendering them simple in construction, easy and cheap to manufacture, more efficient and durable, and adapted for use with a large variety of lenses.

To the attainment of this end, a feature of the invention comprises a lens strap having but a single, perforated ear, which may be shaped to conform to the face of any desired lens, in combination with a post of simple construction, like an eccentric screw, which may be employed to adjust the lens upon the strap.

With the above object in view, the invention consists of the improved ophthalmic mounting hereinafter described, illustrated in the accompanying drawings, and defined in the appended claims.

Figure 1:
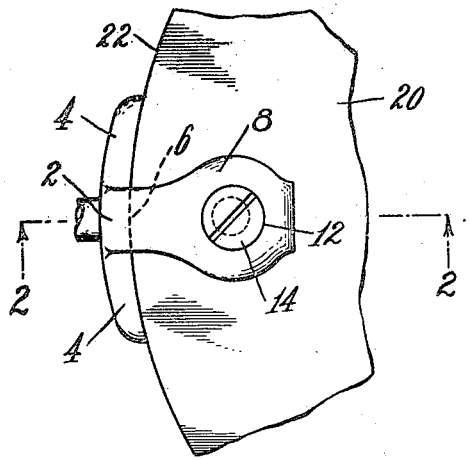
Figure 5:
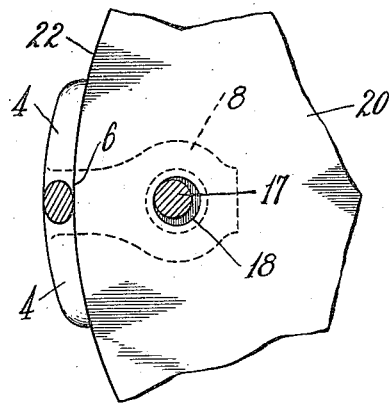
Figure 2:
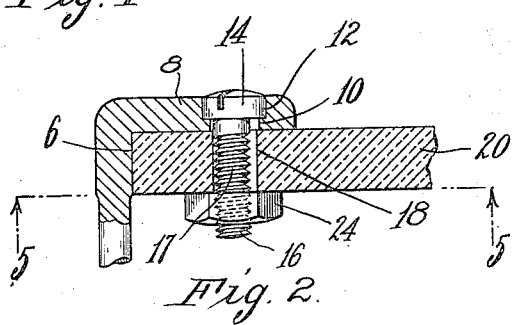
Figure 6:
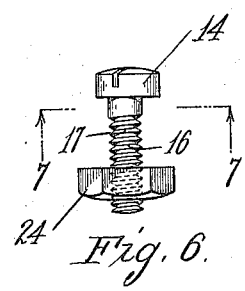
Figure 3:
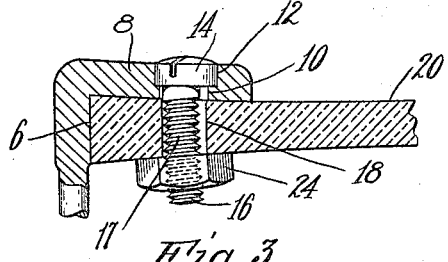
Figure 7:
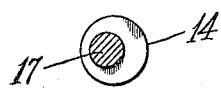
Figure 4:
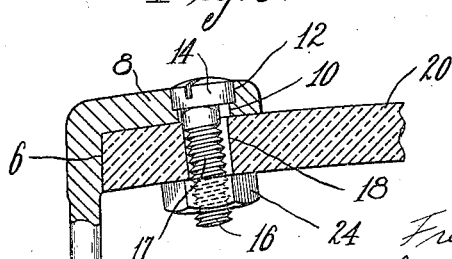

In the drawings, Fig. 1 is a fragmentary front elevation of an ophthalmic mounting embodying the present invention; Fig. 2 is a sectional view thereof, taken substantially upon the line 2—2 of Fig. 1, looking in the direction of the arrows; Figs. 3 and 4 are views similar to Fig. 2, showing the mounting applied to various types of lenses; Fig. 5 is a sectional view, taken upon the line 5—5 of Fig. 2, looking in the direction of the arrows; Fig. 6 is a view in elevation of a preferred form of eccentric post, showing a nut threaded thereon; and Fig. 7 is a sectional view of the post, taken upon the line 7—7 of Fig. 6 and looking in the direction of the arrows.

The invention is shown in its preferred form in connection with a lens strap 2 of a nose bridge, the strap being provided with the usual arms 4 and a lens seat 6. The strap is provided with but a single ear 8, having a perforation 10 that is enlarged at the outer face of the ear, as shown at 12, to constitute a seat for the enlarged head 14 of an eccentric post 16. The wall of the enlarged perforation 12 and the enlarged head 14 are circular in cross section and are preferably cylindrical, as shown. The body or eccentric portion 17 of the post is mounted within a perforation 18 in a lens 20. The lens may be plane as shown in Fig. 2, or it may have any other desired shape, illustrated in Figs. 3 and 4. Upon rotation of the head 14 within the enlarged portion or seat 12 of the perforation 10, the eccentric portion of the post will act as a cam to engage the wall of the perforation 18 and thus adjust the edge 22 of the lens into firm engagement with the lens seat 6. The parts may then be secured in adjusted position. In the illustrated embodiment of the invention, the eccentric portion 17 of the post 16 is shown as screw threaded, a nut 24 being screwed thereon into engagement with a face of the lens, the post and the nut thus cooperating with the ear at the other face to secure the lens in adjusted position upon the strap.

A very simple, cheap, easily manufactured structure is thus provided, permitting the ready adjustment of the edge of a lens of any desired thickness into firm engagement with the lens seat, and the parts may be effectively secured in adjusted position by an ordinary nut.

The mounting is as well adapted for curved lenses, shown in Figs. 3 and 4, as for plane, illustrated in Fig. 2. In Figs. 3 and 4, the ear 8 is shown bent to conform to the face of the desired lens. When the faces of the lens are not parallel, as is the case in Fig. 3, a tightening of the nut 24 to force the nut and the head 14 into substantial parallelism with the respective faces of the lens will cause the body or screw-threaded portion 17 of the post 16 to spring or bend a little, as shown in Fig. 3, the reverse spring action of the post serving to lock the nut effectively in position upon the post. To this end, the body portion of the post should be slender or of small diameter, and the post should be constituted of a resilient material, like steel. By reason of this spring locking effect, the nut can not become loosened accidentally, so that the necessity for employing the customary additional locking means, like teeth, serrations or lugs is done away with. When dealing with lenses having approximately parallel faces, as shown in Figs. 2 and 4, the eccentric post may be initially bent slightly out of its normal straight line form. The same spring locking effect as above described will then be secured when the nut is tightened to bring it into parallelism with the head 14 and with the lens faces.

The ophthalmic mounting of the present invention is readily conformable to the variable demands of lenses of various shapes and sizes, besides providing within itself for effectively locking the adjusted parts in adjusted position. Although shown as applied to a nose bridge, it will be obvious that the invention is not restricted thereto, and may, with equal facility, be applied, for example, to a temple end piece. It will be understood, therefore, that the invention is of general application and of broad scope, unlimited except in so far as limitations may be specifically imposed in the appended claims.

The invention having been thus described, what is claimed as new is:

1. An ophthalmic mounting having, in combination, a lens strap having a lens seat and a single ear provided with a perforation having an enlarged portion at the outer face of the ear to constitute a seat, the wall of the enlarged portion being of circular cross section, a perforated lens, a simple post having an enlarged head of circular cross section seated within the enlarged portion of the ear perforation and a body portion eccentrically disposed to the head within the lens perforation, whereby, upon rotatable adjustment of the post, the edge of the lens may be adjusted into firm engagement with the lens seat, and means independent of the strap engaging a face of the lens and co-operating with the post and the ear to secure the lens in adjusted position upon the strap.

2. An ophthalmic mounting having, in combination, a lens strap having a lens seat and a single ear provided with a perforation the wall of which is of circular cross section, a perforated lens, a screw having a head of circular cross section seated within the ear perforation and a body portion eccentrically disposed to the head within the lens perforation, whereby, upon rotation of the screw, the edge of the lens may be adjusted into firm engagement with the lens seat, and a nut threaded upon the screw to secure the lens in adjusted position upon the strap.

3. An ophthalmic mounting having, in combination, a lens strap having a lens seat and a single ear provided with a perforation having an enlarged portion at the outer face of the ear to constitute a seat, the wall of the enlarged portion being of circular cross section, a perforated lens, a screw having an enlarged head of circular cross section seated within the enlarged portion of the ear perforation and a body portion eccentrically disposed to the head within the lens perforation, whereby, upon rotation of the screw, the edge of the lens may be adjusted into firm engagement with the lens seat, and a nut threaded upon the screw to secure the lens in adjusted position upon the strap.

4. An ophthalmic mounting having, in combination, a lens strap having a single, perforated ear, a perforated lens, and a slender post constituted of resilient material and of diameter small enough to render the post resilient located within the perforations of the ear and the lens for securing the lens to the strap, said post being resiliently set to cause it to lock the lens to the strap.

5. An ophthalmic mounting having, in combination, a lens strap having a single ear, a lens having curved faces, said ear being adapted to be bent so as to conform to one of the lens faces, and a screw constituted of resilient material and a nut co-operating therewith for securing the lens to the strap, said screw having an enlarged head and a slender body portion of diameter small enough to render the screw resilient, the head and the nut being substantially parallel to the respective faces of the lens, said screw being resiliently set to cause it to lock the lens to the strap.

6. An ophthalmic mounting having, in combination, a lens strap having a lens seat and a single, perforated ear, a perforated lens, and an eccentric slender post constituted of resilient material and of diameter small enough to render the post resilient located within the perforations of the ear and the lens and adapted to be rotatably adjusted to cause the post to rotatably engage the walls of the ear and the lens perforations, thereby to adjust the edge of the lens into firm engagement with the seat.

7. An ophthalmic mounting having, in combination, a lens strap having a lens seat and a single ear provided with a perforation having an enlarged portion at the outer face of the ear to constitute a seat, the wall of the enlarged portion being of circular cross section, a perforated lens, a resilient screw having an enlarged head seated within the enlarged portion of the ear perforation and a body portion of small diameter eccentrically disposed to the head within the lens perforation, whereby, upon rotation of the screw, the enlarged head will rotatably engage the wall of the enlarged portion of the ear perforation and the body portion will rotatably engage the wall of the lens perforation to effect an adjustment of the edge of the lens into firm engagement with the lens seat, and a nut threaded upon the screw to secure the lens in adjusted position upon the strap, the head and the nut being substantially parallel to the respective faces of the lens.

8. An ophthalmic mounting having, in combination, a lens strap having a lens seat and a single ear provided with a perforation having a cylindrically enlarged portion at the outer face of the ear to constitute a seat, a perforated lens, said ear being adapted to be bent so as to conform to the surface of the lens, a screw constituted of resilient material having an enlarged cylindrical head seated within the enlarged portion of the ear perforation and a slender body portion eccentrically disposed to the head within the lens perforation, said body portion being of diameter small enough to render the post resilient, whereby, upon rotation of the screw, said body portion will engage the wall of the lens perforation to effect an adjustment of the lens into firm engagement with the lens seat, and a nut threaded upon the screw to secure the lens in adjusted position upon the strap, the head and the nut being substantially parallel to the respective faces of the lens.

9. An ophthalmic mounting having, in combination, a lens strap having a lens seat and a single cylindrically perforated ear, a perforated lens, and a post having a head seated within the cylindrical ear perforation and a body portion eccentrically disposed to the head within the lens perforation, whereby, upon rotation of the post, the edge of the lens may be adjusted into firm engagement with the seat.

10. An ophthalmic mounting having, in combination, a lens strap having a lens seat and a single perforated ear, a perforated lens, a simple post having an enlarged head seated within the ear perforation and a body portion eccentrically disposed to the head within the lens perforation, whereby, upon rotatable adjustment of the post, the edge of the lens may be adjusted into firm engagement with the lens seat, and means independent of the strap engaging a face of the lens and co-operating with the post and the ear to secure the lens in adjusted position upon the strap.

In testimony whereof, I have hereunto subscribed my name this 24th day of November, 1919.

FREDERICK A. STEVENS.